July 26, 1927.
C. M. HIBBETS
1,636,959
CLUTCH PROTECTING DEVICE
Filed Aug. 23, 1926
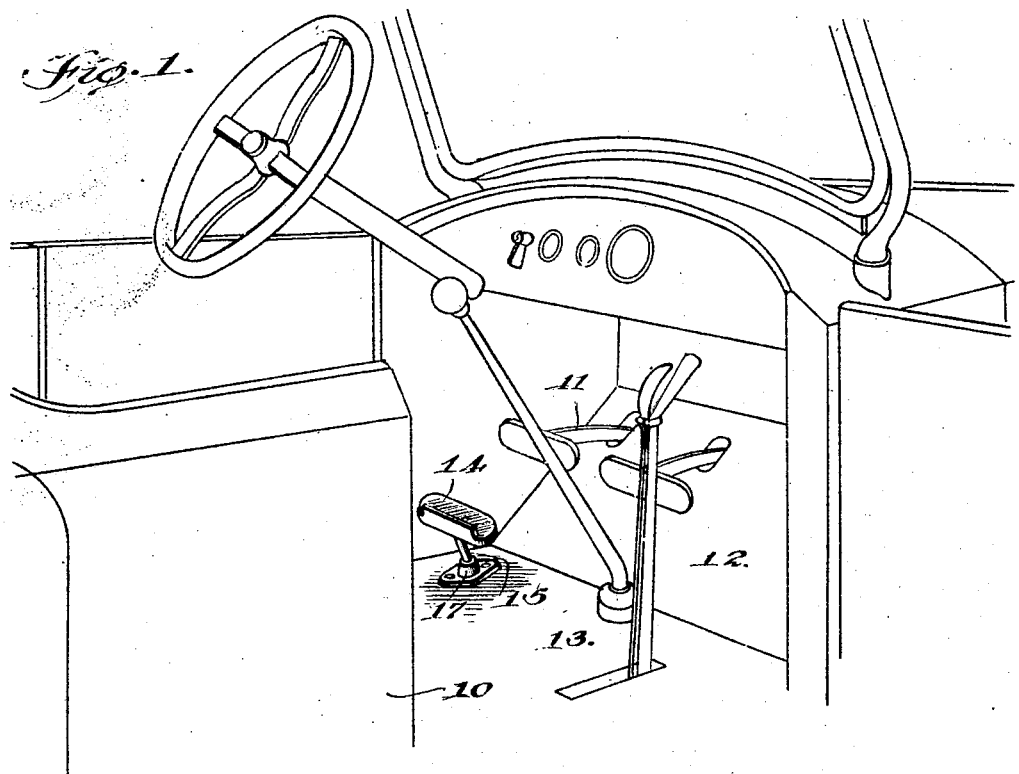
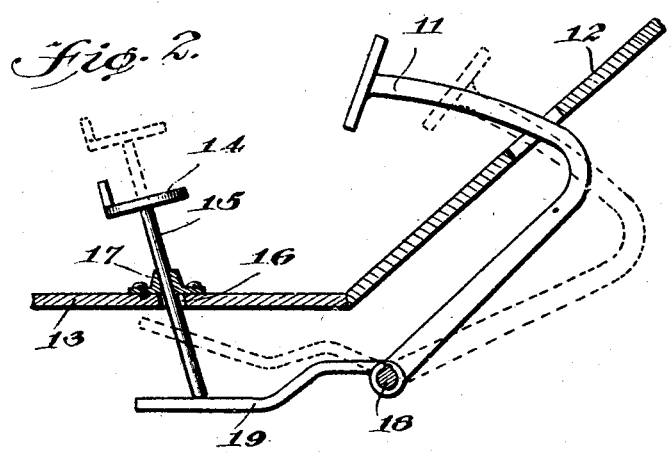
INVENTOR
C. M. Hibbets,
WITNESSES
ATTORNEYS Patented July 26, 1927.

1,636,959

UNITED STATES PATENT OFFICE.

CHARLES M. HIBBETS, OF CLAUDE, TEXAS.

CLUTCH-PROTECTING DEVICE.

Application filed August 23, 1926. Serial No. 131,069.

My present invention relates generally to clutches as used in automobiles, and more particularly to the usual automobile clutch control in the nature of a foot pedal, the object of my invention being the provision of a clutch protecting device, and special means for relieving the clutch from a very common form of abuse known as "riding" the clutch.

The normal life of a clutch is often abridged by permitting the foot to rest inert or inactive thereon while driving, as the slightest pressure thus produced upon the clutch pedal causes the clutch parts to wear quickly and unnaturally. Notwithstanding the usual instructions in connection with automobile driving to avoid this practice, it has become the habit of many drivers to thus "ride" the clutch, and my invention aims to provide a simple inexpensive means to offset the disadvantages of such a practice.

Generally speaking, my invention purposes the provision of simple inexpensive means adapted to sustain the pressure of the foot when resting inert or inactive upon the clutch pedal and arranged to relieve the latter of any foot pressure and hold the food pedal against such movements as it is ordinarily subjected to by virtue of the foot pressure.

In the accompanying drawing which illustrates my present invention and forms a part of this specification:—

Figure 1 is a perspective view illustrating the practical application of my invention, and, Figure 2 is a vertical longitudinal section showing my complete invention in operative connection with the clutch pedal.

Referring now to these figures, and particularly to Fig. 1, I have shown an automobile, generally indicated at 10, provided therein with a clutch pedal 11, projecting as usual through the forward upwardly inclined portion 12 of the floor-board 13, and I have also shown in line with the clutch pedal a heel rest including a heel plate 14 at the upper end of a stem 15.

As seen in Fig. 2, the stem 15 of the heel plate 14 is arranged to depend through an opening 16 in the floor board 13, and is supported by a bearing member 17 secured upon the floor board 13 around the opening 16, which permits the stem 15 to slide up and down. While I have not shown any means to prevent rotation of the stem 15, it will be apparent from the following disclosure of my invention that lengthwise or vertical movement of the stem 15 is alone necessary, and it may well be prevented from rotative movements, as by making the stem with flat sides. Furthermore, the bearing member 17 may be on the underside of the floor board so the heel rest may be set flush with the floor board if desired. It will also be apparent from Fig. 2 that the clutch pedal 11 swings in connection with the clutch shaft 18 which constitutes the fulcrum of its swinging movement and is in accordance with my invention provided with a rigid extension 19, projecting beyond the clutch shaft 18 and upon which the lower end of the heel rest stem 15 is disposed.

In practice the heel rest is placed for the convenient disposal of the heel within the plate 14, when the forward portion of the foot rests comfortably upon the clutch pedal 11. Under normal circumstances the weight of the foot is sustained for the most part upon the heel rest, and thus while some pressure is of course borne by the clutch pedal, the latter is prevented from the slight depressions to which it is ordinarily subjected, by virtue of the greater weight acting outwardly through the stem 15 and against the pedal or shaft extension 19, which is such as to firmly hold the clutch or pedal.

It is obvious from the foregoing that my invention is not only simple economical, but will effectively and efficiently serve the purposes and carry out the objects of my invention, and in addition presents a structure which may be readily installed in connection with automobiles already in use, as well as those to be manufactured.

I claim:

1. In combination with a clutch pedal and a shaft forming the fulcrum of swinging movement of the pedal, an extension carried by the said pedal or shaft and projecting beyond the shaft, and a heel rest including a rest plate disposed in line with the foot pedal to receive the heel of a foot when the forward portion of the foot rests on the foot pedal, and a rigid stem depending from said plate, said stem being shiftable lengthwise with the heel plate and resting at its lower end upon the said extension of the clutch pedal or shaft.

2. In combination with a clutch pedal and a clutch shaft forming the fulcrum of swinging movement of the pedal, an extension carried by the pedal or shaft and projecting beyond the shaft, a heel rest including a heel plate and a stem depending from the plate and resting at its lower end upon the extension of the said pedal or shaft, and a bearing support in which the said stem is shiftable lengthwise in the direction of its length.

3. In combination with a clutch pedal, a heel-engaging means disposed adjacent thereto, said heel-engaging means including a rest plate for the foot of the operator, the foot-engaging surface of said plate being of such form as to substantially prevent accidental slipping of the foot of the operator from its engagement therewith, a rigid stem secured to said rest plate, and an extension upon the clutch shaft engaging said stem, the rest plate being thereby adapted to take the pressure of the foot during inert resting thereof upon the pedal and the rest.

4. In combination with a clutch pedal and clutch shaft provided with an extension thereof, a foot rest adjacent said pedal, a rigid stem depending from said foot rest and engaging the extension of the clutch shaft, said foot rest and shaft forming connections between the foot rest and pedal to relieve the latter of all foot pressure during inert inactive disposition of the foot upon the clutch pedal and rest.

5. In combination with a clutch pedal, a foot rest adjacent thereto, a shaft with an extension thereon associated with said pedal, and means associated with the foot rest engaging said extension and relieving the pedal of all foot pressure during inactive disposition of the foot upon the clutch pedal and the foot rest.

6. In combination with a clutch pedal, a movably mounted foot rest adjacent to said pedal, and means for transmitting motion from said foot rest to the clutch pedal so that the clutch will be relieved of all foot pressure when the foot of an operator rests inert on both said clutch pedal and said foot rest.

7. In combination with a clutch pedal and a clutch shaft, a movably mounted foot rest adjacent to said pedal, a rigid stem depending from the foot rest, and means for transmitting motion from said stem to said clutch shaft for preventing foot pressure on the clutch when the foot of an operator rests inert on both said clutch pedal and said foot rest.

8. In combination with a clutch shaft and a clutch pedal operatively connected to the clutch shaft, a foot supporting means separate from the clutch pedal but operatively connected to the clutch shaft to oppose the action of the clutch pedal and thereby relieve the clutch shaft and the clutch pedal of all foot pressure during inert inactive disposition of the foot upon the clutch pedal and the foot supporting means.

CHARLES M. HIBBETS.